United States Patent

Anderson

[15] 3,704,940
[45] Dec. 5, 1972

[54] UNITARY PROJECTOR PLAYER

[72] Inventor: Ray C. Anderson, 3700 15th Street, Rock Island, Ill. 61201

[22] Filed: Aug. 12, 1971

[21] Appl. No.: 171,130

[52] U.S. Cl. ..........................352/72, 352/8, 352/74, 352/123, 274/4 F
[51] Int. Cl. ............................................G03b 23/02
[58] Field of Search...............352/6, 72, 74, 123, 8; 274/4 F; 214/6 BA

[56] References Cited

UNITED STATES PATENTS

| | | | |
|---|---|---|---|
| 3,289,962 | 12/1966 | Gellenthin | 274/4 F |
| 3,472,579 | 10/1969 | Schwartz | 274/4 F |
| 3,512,786 | 5/1970 | Ban | 274/4 F |
| 3,582,082 | 6/1971 | Tagagi | 352/123 X |

*Primary Examiner*—Samuel S. Matthews
*Assistant Examiner*—Alan A. Mathews
*Attorney*—Frank R. Thienpont

[57] ABSTRACT

A self-contained unitary projector-player unit to provide a complete entertainment center within itself including a housing, a projector in the housing, a rear projector screen formed in the sidewall of the housing and including a film cartridge change mechanism for handling a plurality of film cartridges and sequentially inserting a cartridge from a stack of cartridges into the projector-player, withdrawing the cartridge after play has been completed, stacking the used cartridge in a receiving receptacle, and inserting the next cartridge in sequence into the projector player.

8 Claims, 6 Drawing Figures

PATENTED DEC 5 1972

Inventor:
Ray C. Anderson
By: Frank R. Thienpont
Atty

UNITARY PROJECTOR PLAYER

BACKGROUND OF THE INVENTION

This invention relates to a projector-player unit which defines within itself a complete entertainment unit and includes automatic film cartridge changing mechanism.

SUMMARY OF THE INVENTION

A principal object of the invention is to provide a unitary self-contained device to function as a complete entertainment unit, and including a housing, a rear projection screen in the housing, sound apparatus, a projector apparatus, and an automatic cartridge change mechanism for automatically injecting and ejecting film cartridge into and out of the film projector.

Another object of the present invention is to provide a unitary self-contained automatic sound film projector having associated therewith an automatic cartridge change mechanism including a reciprocating slide mechanism for automatically injecting film cartridges into and ejecting film cartridges from the associated film projector.

Another object of the invention is to provide an automatic cartridge change mechanism for projector-players using cartridges of the continuous strip type and employing a reciprocating slide mechanism which carries a fixed injector arm for inserting the cartridge into the player, and an expansible ejector arm for removing the cartridge from the player and being adaptable not to interfere with the injection of succeeding cartridges into the player.

It is a more particular object to provide a unique cartridge configuration for use with the projector-player and having a pair of integral horizontally opposed arms and tapered upper and lower surfaces to facilitate precise injection and ejection of the cartridges into the player.

It is still another object to provide a slide mechanism of the type described in which the injector arm contacts the opposed arms of the cartridge for inserting into the player, and the ejector arms contact the opposed arms during ejection but are expanded so as to clear the opposed arms during the next injection motion.

Other objects and advantages of this invention will become apparent when considered in connection with the accompanying drawings.

BRIEF DESCRIPTION OF THE DRAWINGS

FIG. 6 is a plan view of a film cartridge used in the projector-player.

DESCRIPTION OF THE PREFERRED EMBODIMENT

Figure 1:
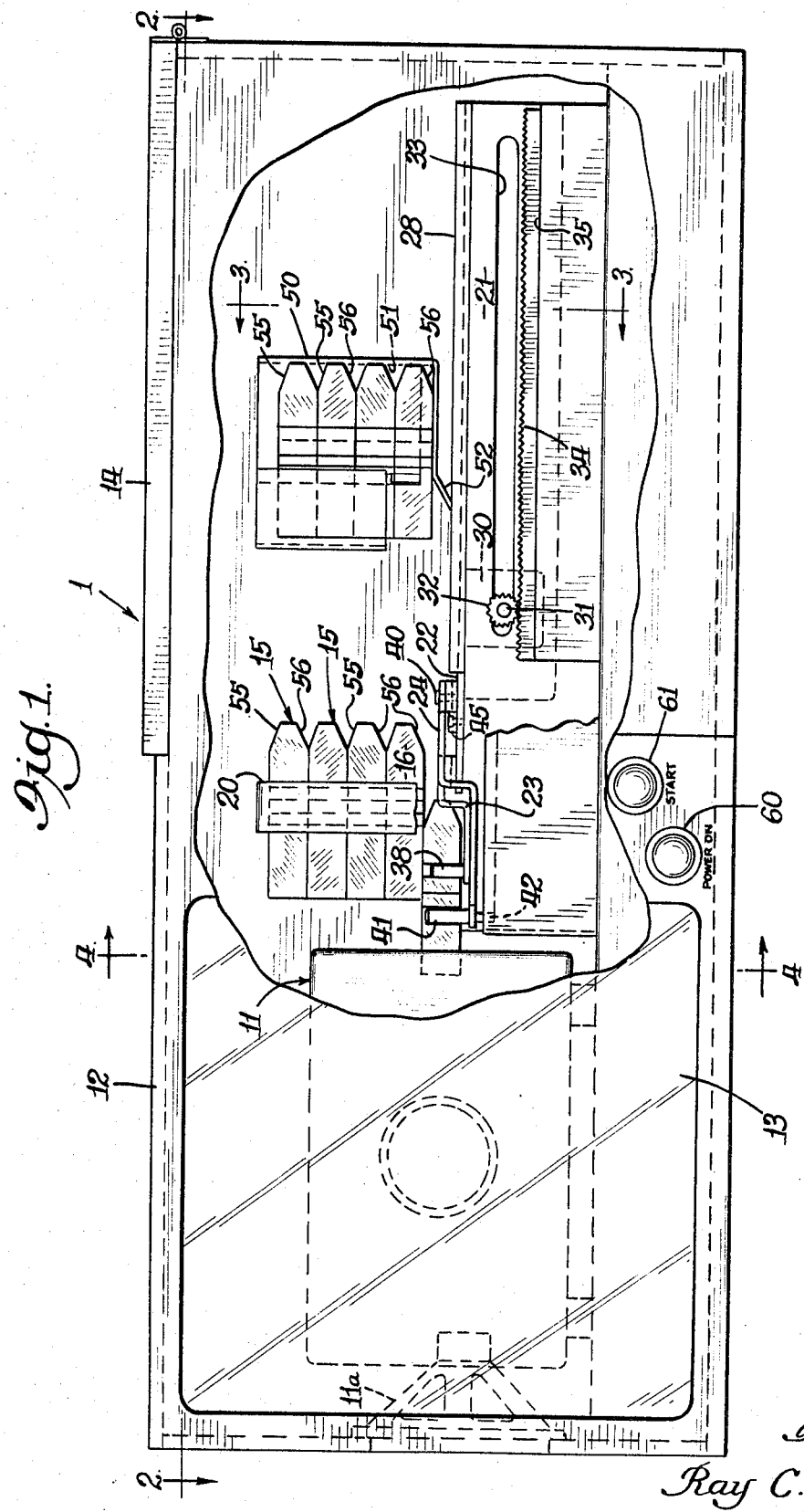
FIG. 1 is an elevation view, partially cut away, of the projector-player.
Figure 2:
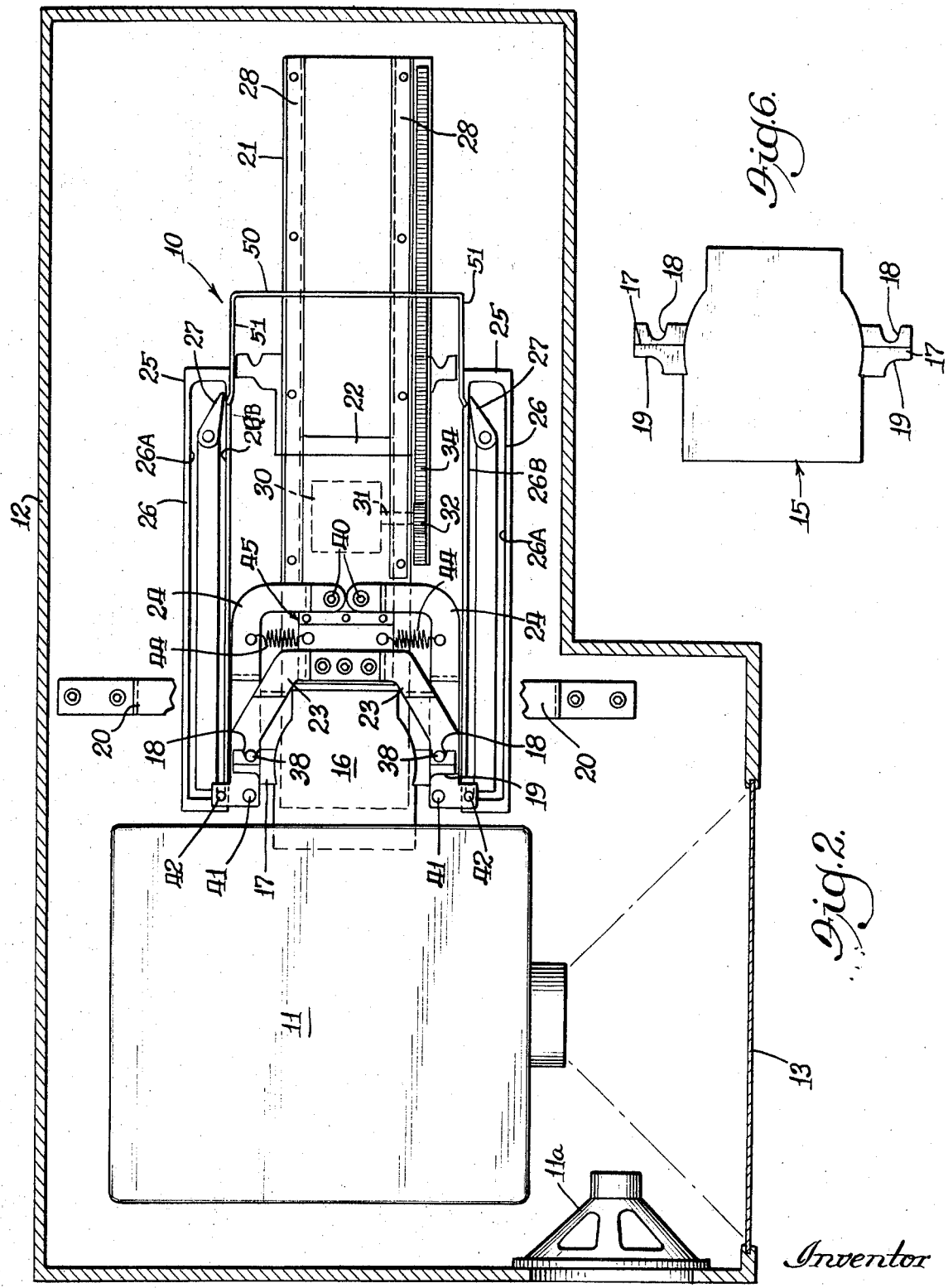
FIG. 2 is a plan view taken on line 2—2 of FIG. 1.
Figure 3:
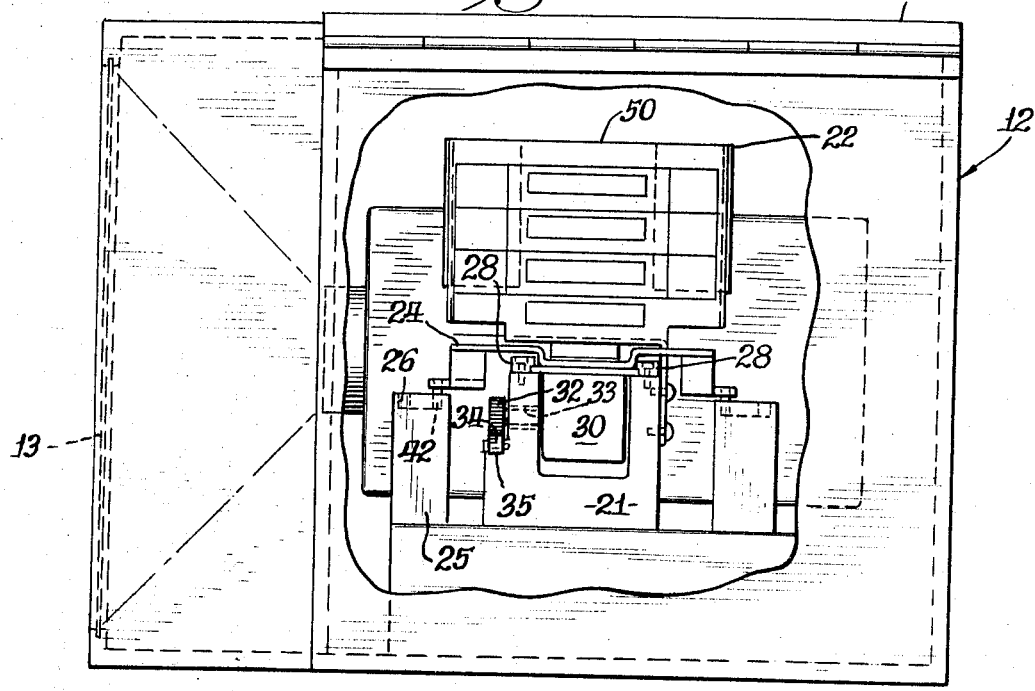
FIG. 3 is a right end view of the unit of FIG. 1.
Figure 4:
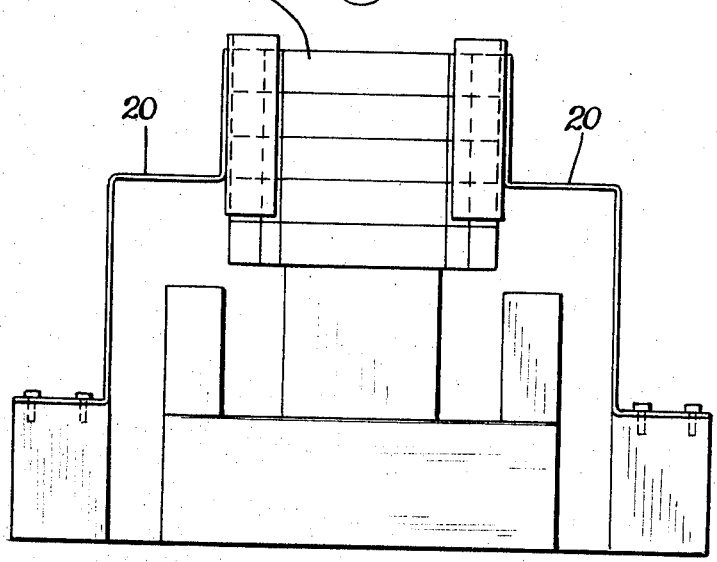
FIG. 4 is an opposite end view taken on line 4—4 of FIG. 1.

The complete projector-player device disclosed herein is designated generally by the numeral 1. It includes a film cartridge selector mechanism 10, a projector 11 and a speaker 11a contained within a housing 12. The housing has a rear projection screen 13 with glass protection disposed in one of the four sidewalls and on which film images are projected. An appropriate speaker system including the speaker 11a may be incorporated into the housing 12. The housing 12 also has a hinged lid 14 for providing easy access in loading the mechanism 10 with film cartridge 15.

It is important to note that this unitary self-contained unit provides a complete entertainment unit within itself including a projection screen within the unit as well as an automatically changing film cartridge mechanism. Thus the unit partakes of the advantage of the combination of an ordinary TV unit and an automatic record changer, and its uniqueness as a home entertainment unit becomes readily apparent.

A device of this general type is disclosed in my copending application for U.S. Pat. Ser. No. 806,619, filed Mar. 12, 1969.

Each of the continuous loop film containing cartridges 15 is preferably formed of a unitary molded plastic shell 16 and has integral, horizontal, oppositely extending arms 17 formed on opposite sides of the cartridge. Each of the arms 17 is formed on one side with a pin receiving groove 18 and an ejector contact surface 19 on the opposite side. The film cartridges are tapered at one end on their upper and lower faces to facilitate stacking at the completion of ejection as hereinafter further explained.

A pair of loading guides 20 are mounted on the interior of the housing 12, and the mechanism 10 is loaded by inserting a stack of cartridges 16 with their respective arms 17 engaged by the guides 20.

Figure 5:
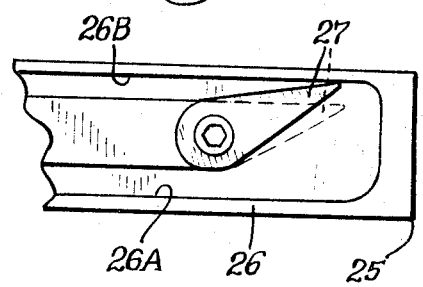
FIG. 5 is an enlarged fragmentary view of a portion of FIG. 2.

The selector mechanism 10 also comprises a base block 21 mounted within the housing 12, a slide plate 22 disposed to slide horizontally on top of the block 21, a pair of injector arms 23 rigidly attached to the plate 22, and a pair of ejector arms 24 pivotally attached to the plate 22. A pair of guide blocks 25 are mounted within the housing 12 on opposite sides of the base block 21 and each has formed on its upper surface an elongate substantially rectangular groove or track 26. A torsion arm 27, biased into a closed position, as shown in FIG. 5, is mounted within the outermost end of groove 26. The slide plate 22 is constrained to move in one dimension by a pair of overlying flange rails 28 secured to the base block 21.

The slide plate 22 is caused to move longitudinally by an electric motor 30 rigidly attached to the plate 22. The motor 30 has a drive shaft 31 which carries a pinion gear 32. The block 21 is formed with an elongate longitudinal horizontal slot 33 through which the shaft 31 extends, and the gear 32 engages a rack 34 mounted on a horizontal ledge 35 on the side of the block 21. A well 30a in the base block 21 accommodates the reciprocating movement of the motor 30.

The arms 23 are rigidly attached to the forward end of plate 22 and each arm carries an upwardly extending injector push pin 38. The pins 38 are adapted to engage the grooves 18 formed in the arms 17 of a cartridge 15.

The arms 24 are pivotally mounted on the plate 22 by pins or bolts 40 and each carry an upwardly extending ejector pull pin 41 and a downwardly extending guide pin 42. The ejector pins 41 are adapted to engage the surfaces 19 on the arms 17 of cartridge 15, and the pins 42 engage the groove 26 in the guide blocks 25. The arms 24 are biased inwardly by tension springs 44 attached to the arms 24 and to the slide 22. The inward motion of the arms 24 is limited by a back-up key or stop 45 attached to the slide 22.

A reverse stacking guide or receptacle 50 is mounted on top of the base block 21 and has retaining sidewalls 51 and a guide ramp 52. As previously mentioned, the film cartridge shells 16 are tapered at 55 and 56 to provide upper and lower entry angles to facilitate reverse stacking of the cartridges into the receptacle 50.

It is to be understood that the total mechanism also includes suitable electric power and start control switches 60 and 61.

The operation of the selector mechanism 10 in conjunction with the projector 11 may be described as follows:

The lid 14 is raised and the cartridges 15 are stacked into the guides 20 in the desired order of play. The motor 30 is energized, the pins 38 engage the arms 17, and the bottom cartridge 15 is injected into the projector 11 for play. Upon the completion of the particular film, the motor 30 is automatically energized again in the reverse direction. The ejector pins 41 engage the surfaces 19 of the arms 17 and the slide 22 moves to the right, as shown in FIG. 1, and carries the cartridge 15 with it. The tapered lower surface 56 of the cartridge engages the ramp 52 and the cartridge 15 is forced into the receptacle 50. As soon as the cartridge to be ejected has cleared the cartridge immediately above it, the latter will fall into position on block 21 by gravity and is in readiness to be moved into a "play" position on the next injection cycle.

During the ejection cycle, the pins 42 on the ejector arms 24 move along through the inboard portion 26B of the grooves 26. Upon passing the torsion arm 27, the pins 42 are guided into the outboard portions 26A of the grooves 26. During the next injection cycle, the pins 42 force the arms 24 apart so that the ejector pins 41 clear the arms 17 of the next cartridge 15 and the injector pins 38 force this cartridge into the projector 11. When the slide 22 reaches the limit of its motion to the left, the pins 41 have cleared the arms 17, and the bias springs 44 cause the arms 24 and guide pins 42 to move into the inboard portion 26B of the groove 26. The arms 24 are thus in position to remove the next cartridge 15 upon completion of its play. In the "play" position the cartridge 15 is held fast by suitable means (not shown). The cycles described are repeated automatically until all of the cartridges 15 in the guides 20 have been played.

It should be noted that when one or more cartridges 15 are already received within the receptacle 50, the tapered upper surface 55 of the succeeding cartridge 15 strikes the bottom of the previous cartridge and forces it upward for stacking.

It is to be understood that the embodiment shown and described is by way of example only, and the invention is not to be considered as limited thereto except insofar as the claims may be so limited.

I claim:

1. In a self-contained automatic film cartridge projector apparatus the combination comprising:
a housing having a plurality of side walls;
a rear projection screen disposed in one of said side walls of said housing;
film projector means disposed in said housing for projecting images on said screen;
a fixed base;
a horizontally movable slide mechanism mounted for reciprocating sliding movement on said base for sequentially injecting film cartridges into the projector;
injector arm means mounted on said slide mechanism and carrying a pair of injector pins adapted to contact a pair of opposed horizontally extending arms on the film cartridge during the injection cycle;
ejector arm means also mounted on said slide mechanism and carrying a pair of ejector pins adapted to contact the arms on said cartridges during the ejection cycle; and
guide means effective to cause said ejector pins to clear the arms of said cartridges during the injection cycle.

2. The combination of claim 1 wherein said ejector arm means comprises:
a pair of pivotally mounted arms each carrying one of said ejector pins; and
spring bias means connected to said arms and to said slide mechanism and effective to bias said arms together.

3. The combination of claim 2 wherein said guide means comprises:
a guide block formed with a recessed continuous groove in the face of said block; and
a guide pin mounted on said ejector arm and engaging said groove.

4. The combination of claim 3 wherein said continuous groove is in the form of an elongated rectangle disposed parallel to the direction of travel of said slide mechanism and in which said guide pin engages the groove nearest to said slide mechanism during the ejection cycle and engages to outermost groove during the injection cycle.

5. The combination of claim 4 including:
a torsion arm mounted within said groove and effective to direct said guide pin into said outermost groove upon completion of an ejection cycle and commencement of the next injection cycle.

6. The combination of claim 1 including:
a pair of vertically mounted guide channels disposed above said slide mechanism and effective to retain the arms of a stack of cartridges.

7. The combination of claim 1 including:
a cartridge receiving receptacle mounted above said slide mechanism and having a sloping ramp by means of which said cartridges are removed from said slide mechanism during the ejection cycle.

8. The combination of claim 1 including drive means for driving said slide mechanism comprising:
a electric drive motor carrying a pinion gear; and
a rack engaged by said pinion gear with one of said elements being mounted on said base and the other on said slide mechanism.

* * * * *